UNITED STATES PATENT OFFICE.

ARCHIBALD DRUMMOND CARMICHAEL, OF BROKEN HILL, NEW SOUTH WALES, AUSTRALIA.

DESULFURIZING SULFID ORES.

SPECIFICATION forming part of Reissued Letters Patent No. 12,105, dated April 21, 1903.

Original No. 705,904, dated July 29, 1902. Application for reissue filed March 3, 1903. Serial No. 146,029.

*To all whom it may concern:*

Be it known that I, ARCHIBALD DRUMMOND CARMICHAEL, metallurgist, a subject of the King of Great Britain, residing at the Royal Hotel, Argent street, Broken Hill, in the State of New South Wales, in the Commonwealth of Australia, have invented certain new and useful Improvements in the Desulfurizing of Sulfid Ores Preparatory to Smelting, of which the following is a specification.

The invention relates to the treatment of sulfid ores or metallic sulfids, mattes, or metallurgical products preparatory to smelting, and more particularly to the treatment of lead sulfid ores and other metallic sulfids, such as sulfids of zinc, copper, or iron and mixtures of the same. Its object is to desulfurize and cinerate such ores or products and to change them into a condition more suitable for the smelting process. In the processes hitherto employed such ores or products have first been subjected to a preliminary roast in a suitable furnace, with or without suitable chemical reagents, for the purpose of oxidizing or sulfating the metallic sulfids. The charge has then been removed to a converter or other suitable receptacle, where it has been subjected to an induced current of air for the completion of the oxidation.

My invention consists, essentially, in dispensing with the preliminary roasting and in the complete desulfurization and cineration of the sulfids in the converter in one operation. I accomplish this by mixing with the raw sulfid ore or metallurgical product a suitable proportion of calcium sulfate and by subjecting the mixture in a converter to the action of an induced current of air, starting the reactions by means of heat, whereby sulfate of the metal and calcium sulfid are produced, and the calcium sulfid in its oxidation produces sufficient heat to set up the necessary desulfurization reactions and to thoroughly oxidize and cinerate the ore without loss by volatilization.

In the place of calcium sulfate I may employ gypsum or sulfid of calcium where the latter can be obtained at less cost as a waste product in such as the Leblanc alkali process. Where gypsum is employed, it may be found desirable to subject it to a dehydrating process before employing it in the converter.

In my invention I first intimately mix with the sulfid ore or product a definite percentage of calcium sulfate or calcium sulfid or gypsum. The percentage required may be from ten to thirty-five per cent., according to the grade of ore under treatment. The mixture is fed into a converter and gradually heated externally until the lower portion of the charge—say one-third to one-fourth—attains a dull-red heat of, say, about four hundred degrees (400°) centigrade, or in lieu of this the reactions may be started by throwing into the empty converter a shovelful of glowing coal and turning on a small amount of air sufficient to keep this burning and then feeding the charge on top of the coal. This heating results in the partial conversion of the metallic sulfid to sulfate and a corresponding reduction of the calcium sulfate to calcium sulfid—this in, say, the case of lead—according to the following equation:

$$Pb.S+CaSO_4=CaS+Pb.SO_4.$$

This heated mixture being continuously subjected to the induced current of air, the calcium sulfid is oxidized and converted into calcium sulfate, and the calcium sulfate is thus regenerated for renewed use according to the following equation:

$$CaS+4O=CaSO_4,$$

and in such exothermic chemical reaction sufficient heat is generated to complete the desulfurization of the charge by the concurrent reactions set up by the metallic oxids and sulfates produced by the calcium-sulfate salt on fresh or undecomposed portions of the original charge of orestuff, as hereinafter described. The calcium sulfate being regenerated is free to react on a further definite portion of the undecomposed original charge of orestuff or metallurgical product with a similar result as that before described, and these alternating reactions occur until near the end of the treatment. Concurrently with the sulfatizing of the metallic sulfids by the calcium sulfate and the reduction of the sulfate of calcium to sulfid of calcium and its regeneration to calcium sulfate by the oxygen of the induced current of air the following reactions and desulfurizing changes are effected in the charge of orestuff as the temperature increases from the exothermic reactions and in direct proportion to the amount of the sulfate of metal formed. The first that probably occurs is that in which two molecules of the metallic sulfid react on one molecule of the metallic sulfate with reduction to the metal metallic sulfid and sulfurous acid, as shown by the following equation in the case of lead:

$$2Pb.S+Pb.SO_4=2Pb.+Pb.S+2SO_2.$$

In the presence of the induced current of air which is permeating the mass the metal so formed is oxidized and in this state reacts on a further portion of the produced metallic sulfid with an increased formation of metal and evolution of sulfurous acid according to the following equation in the case of lead:

$$2Pb.O+Pb.S=3Pb.+SO_2.$$

The metal so produced in this last reaction is wholly or partially reoxidized from the oxygen of the air-current and, being free to react on still further portions of the metallic sulfid, repeats the reaction and becomes an important factor in the desulfurizing of the undecomposed portion of the charge of orestuff. As the desulfurization proceeds and the sulfate of metal accumulates reactions are set up between the metallic sulfid and different multiple proportions of the metallic sulfate with the formation of metal metallic oxid and evolution of sulfurous acid, as shown, as follows: with two molecules of metallic sulfate to one molecule of metallic sulfid in the case of lead according to the following equation:

$$Pb.S+2Pb.SO_4=2Pb.O+Pb.+3SO_2;$$

with three molecules of metallic sulfate to one of metallic sulfid in the case of lead according to the following equation:

$$Pb.S+3Pb.SO_4=4Pb.O+4SO_2.$$

At this stage of the desulfurization the temperature of the mass has reached about a maximum, a considerable shrinkage has taken place, and the mixture has a tendency to become pasty. This becomes more marked as the production of metallic oxid predominates, and as the desired desulfurization-point is attained the mixture fuses to a mass of metallic oxid in conjunction with the gangue of the ore or ores under treatment. At this fusion stage the sulfid of calcium produced from the calcium sulfate cannot readily oxidize, owing to the difficulty of coming into actual contact with the air in the pasty mass, but being subjected to the strong oxidizing action of the metallic oxids produced results in the formation of a plumbate of calcium and evolution of sulfurous acid. The mass, consisting of metallic oxid and plumbate of calcium, then cools and cinerates as the exothermic action ceases and can be readily removed to a blast-furnace for smelting for the recovery of the metals.

Though my invention is described more particularly with reference to lead sulfid ores containing zinc, such as are commonly known as the "Broken Hill sulfids," I wish it to be clearly understood that my process may be equally applied to other classes of sulfid ores, such as copper sulfids, &c.

Having thus described my invention, what I claim as new therein, and desire to secure by Letters Patent, is—

1. The process of treating mixed sulfid ores, which consists in mixing with said ores a sulfur compound of a metal of the alkaline earths, starting the reaction by heating the same, thereby oxidizing the sulfid and reducing the sulfur compound of the alkali metal, and passing a current of air to oxidize the reduced sulfur compound of the metal of the alkalies, substantially as and for the purpose set forth.

2. The process of treating mixed sulfid ores, which consists in mixing calcium sulfate with said ores, starting the reaction by means of heat, thereby oxidizing the sulfid ores, liberating sulfurous-acid gas and converting the calcium sulfate into calcium sulfid and oxidizing the calcium sulfid to sulfate, substantially as and for the purpose set forth.

ARCHIBALD DRUMMOND CARMICHAEL.

Witnesses:

CHARLES STANLEY BURGESS,
CLEMENT ALFRED HACK.